United States Patent [19]
Stewart

[11] Patent Number: 5,503,316
[45] Date of Patent: Apr. 2, 1996

[54] ARTICLE HOLDER FOR A SUN VISOR

[76] Inventor: James M. Stewart, 4914 Colley Ave., Norfolk, Va. 23508

[21] Appl. No.: 249,209

[22] Filed: May 26, 1994

[51] Int. Cl.⁶ .................................................. B60R 7/05
[52] U.S. Cl. ........................................ 224/312; 224/901
[58] Field of Search ........................... 200/312, 218, 200/219, 222, 242, 245, 267, 901

[56] References Cited

U.S. PATENT DOCUMENTS

| | | | |
|---|---|---|---|
| D. 310,301 | 9/1990 | Burrow | D3/34 |
| 3,199,754 | 8/1965 | Sorensen | 224/222 |
| 3,430,299 | 3/1969 | Copen | 24/73 |
| 3,809,428 | 5/1974 | Cohen | 296/97 |
| 3,877,745 | 4/1975 | Girard | 296/97 |
| 4,220,302 | 9/1980 | Hampton et al. | 224/901 |
| 4,477,005 | 10/1984 | Martinez | 224/218 |
| 5,190,197 | 3/1993 | Novak | 224/901 |
| 5,221,031 | 6/1993 | Prigmore | 224/267 |
| 5,332,138 | 7/1994 | Gross et al. | 224/312 |
| 5,392,975 | 2/1995 | Blankenship, Jr. | 224/242 X |

*Primary Examiner*—Renee S. Luebke

[57] ABSTRACT

An article holder is provided for supporting a personal aerosol weapon to a sun visor. An elongated strap has its free ends releasably engaging one another and is secured to the sun visor. The strap has hook and eye fasteners disposed between the free ends for releasably securing a housing on the strap. The housing receives an aerosol container therein.

5 Claims, 2 Drawing Sheets

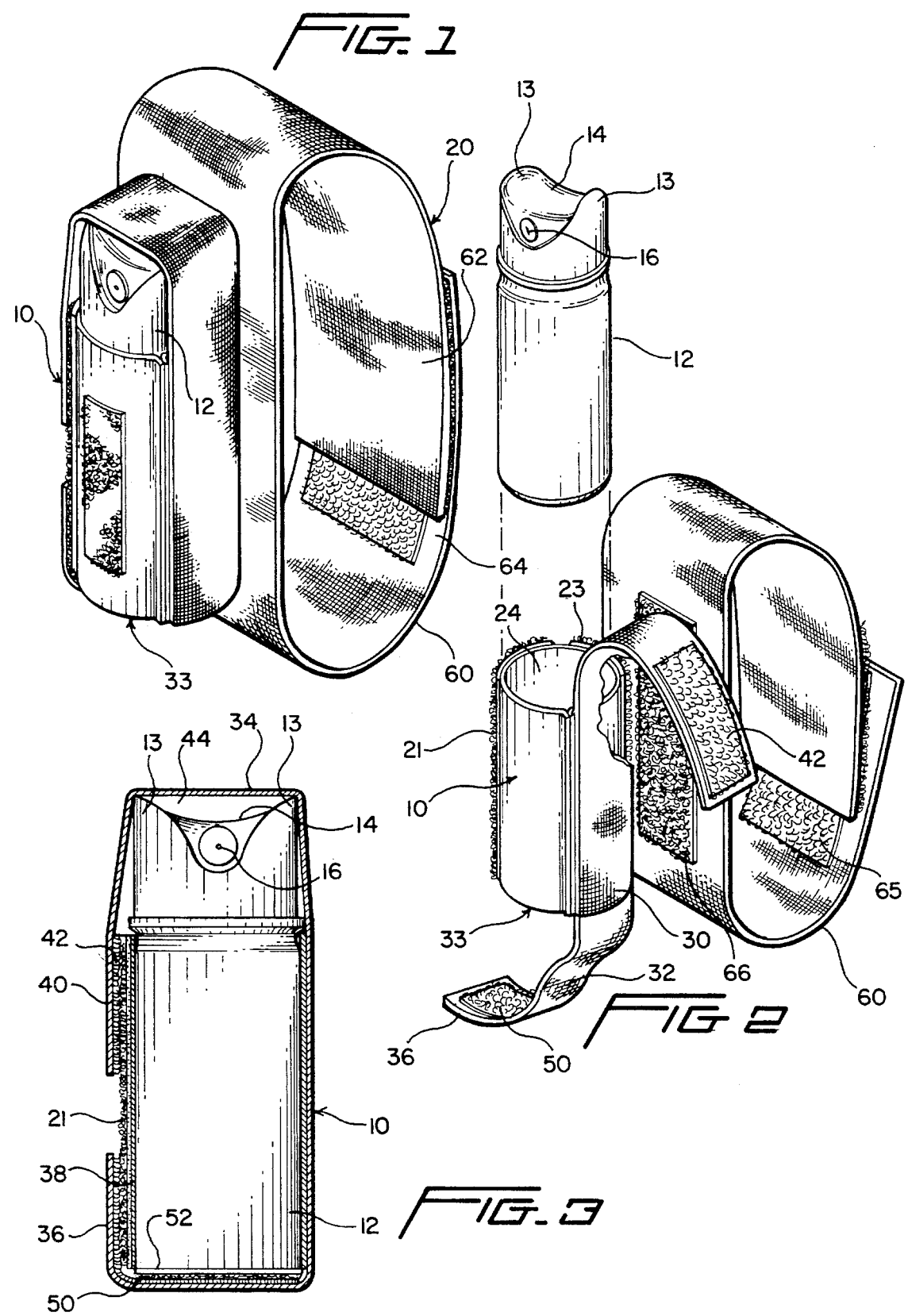

ARTICLE HOLDER FOR A SUN VISOR

BACKGROUND OF THE INVENTION

1. Field Of the Invention

This invention pertains to an article holder for a sun visor and specifically to a holder for supporting a personal aerosol weapon on a sun visor.

2. Background of the Prior Art

The prior art discloses various devices attached by straps, tubes or sleeves to sun visors.

U.S. Pat. No. 3,430,299 discloses an adjustable strap for supporting an umbrella scabbard on a sun visor. U.S. Pat. No. 3,809,428 shows a stretchable sleeve-like member for storing articles on a sun visor. U.S. Pat. No. 3,877,745 discloses spring based straps for supporting a sun shield. Des. Pat. No. D310,301 discloses an eyeglass holder on a sun visor.

SUMMARY OF THE INVENTION

Motor vehicle owners and operators have experienced an alarming number of personal attacks and car jackings. Some have been fatal.

In many states, it is permissible for persons to carry aerosol weapons such as mace for personal protection.

There is a need for such weapons for use by car owners and operators and to provide a storage area for such weapons at a convenient location in an automobile.

It is an object of this invention to provide means for supporting an aerosol weapon canister to a sun visor.

It is another object of this invention to provide said canister with means to securely support the canister to a sun visor yet conveniently and easily permit a driver easy access to the canister weapon.

It is yet another object of this invention to provide an aerosol canister weapon holder with releasable fasteners whereby the weapon may be quickly removed from its visor support and used in a defensive manner.

These and other objects of this invention will become apparent to those skilled in the art to which the invention pertains from a reading of the following specifications when viewed with the annexed drawings.

BRIEF DESCRIPTION OF THE DRAWINGS

FIG. 1 is a perspective view of an aerosol weapon in a holder and supported on a support strap.

FIG. 2 is a perspective view of an aerosol weapon canister explodedly removed from a holder with strap.

FIG. 3 is a perspective view in section of an aerosol weapon canister inside a holder therefore.

DETAILED DESCRIPTION OF THE PREFERRED EMBODIMENT OF THE INVENTION

Figure 4:
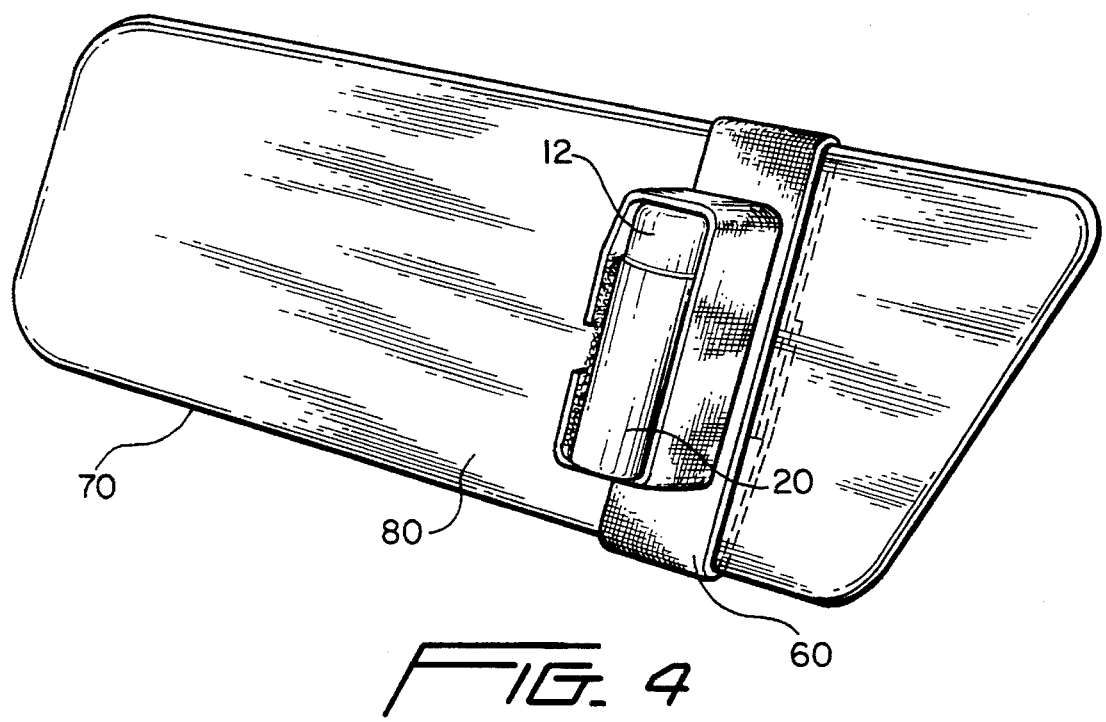
FIG. 4 is a perspective view of the holder and weapon attached to a sun visor by a support strap.
Figure 5:
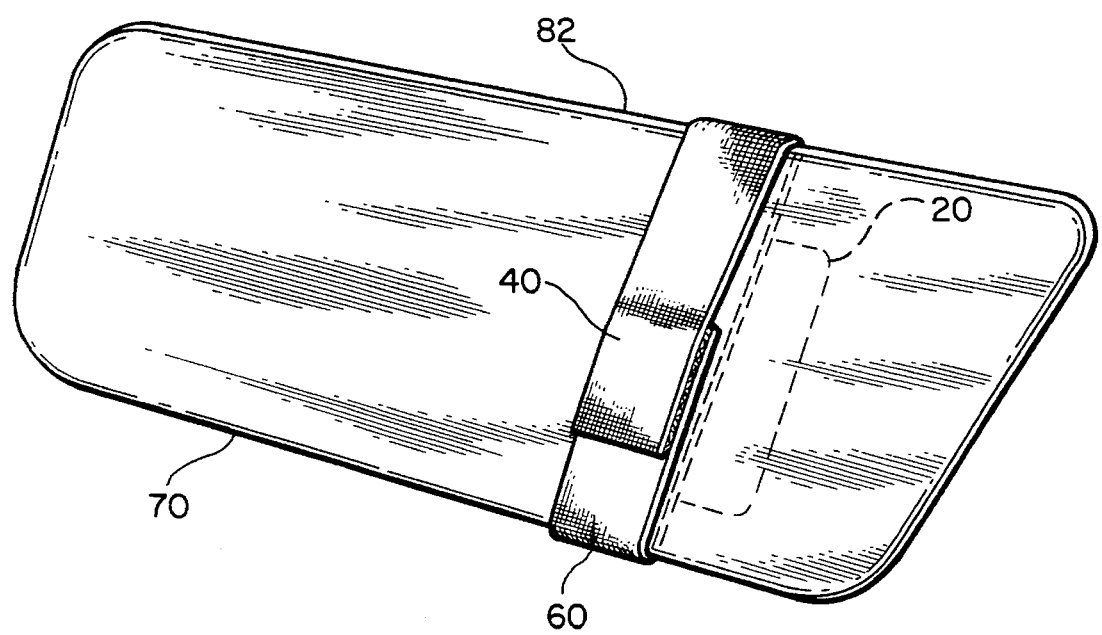
FIG. 5 is a perspective view of the holder positioned behind the sun visor.

Referring now in more detail to the drawings, FIG. 1 discloses an aerosol container weapon housing 10 attached to support strap 20, the latter for holding the housing to a sun visor of a vehicle, FIGS. 4 and 5.

The aerosol canister 12, FIG. 2, is a typical mace dispenser having top edges 13, depressible button 14, and a dispensing nozzle 16. Mace in the canister 12 is dispensed through the nozzle 16 when button 14 is depressed.

It is desirable that the mace canister 12 be conveniently and easily accessible to a driver in the event of an attack by a robber or would be car jacker.

To this end, the invention provides a housing 10 having an elongated body with an open bottom end 33 and an open top end 24. Extending vertically from bottom end 33 to top 24 of the housing 10 on one side is a fastener member 21 which is of the hook and loop construction as in hook and eye. There is an additional similar fastener member 23 adjacent the fastener member 21. These fasteners will be explained more fully below.

A strap 30 has a bottom portion 32 and top portion 34 is secured vertically along the side of the housing 10 opposite fastener strip 21. The bottom end 32 of the strap 30 covers the opening 33 of the housing 10 and the free end 36 has a fastener 38 for cooperating with fastener strip 21 to hold the end 32 against the opening 33 to the housing 10.

It will be understood that the end 36 may be pulled away from the housing 10 permitting access through the opening 33 to the interior thereof. Thus, the container 12 may be inserted into the housing in this fashion.

The top portion 34 of the strap 30 is looped over the top edges 13 of the container 12 and the free end 40 with VELCRO fastener 42 is attached to the hook and eye strip 21 thereby holding the canister 12 within the housing 10.

It will be seen that a space 44 exists between the top 34 of the strap 30 and the button 14. The space 44 provides easy access of a finger to activate the button 14.

It is important to prevent the container 12 from rotating within the housing 10 whereby the dispenser nozzle 16 is always free of obstruction of the strap 30. To this end, the bottom 32 of the strap 30 has a fastener strip 50 on the inside which cooperates with a fastener strip 52 attached to the bottom of the canister 12. These fasteners 50 and 52 are of the hook and eye type such as VELCRO and when pressed together hold the container 12 from rotating within the housing 10.

Other means of preventing rotating of the canister are available, i.e., the edges 13 may be notched and the top 34 of the strap may have ribs laying in the notches. Such construction would prevent rotating of the container 12 in housing 10.

It is important that the container 12 with housing 10 be conveniently and easily accessible to a driver in the event of an attack. To this end, the invention provides a housing support 20 which is an elongated belt 60 having opposed free ends 62, 64 with hook and eye fasteners 65. The belt 60 is looped around the sun visor 70, FIGS. 4 and 5 and fastened thereto by the ends 62 and 64. The belt 60 has a fastener strip 66 attached thereto midway between the free ends 62 and 64. The housing 10 is held to the belt by fastener strip 23 when pressed against fastener strip 66. Thus the housing 10 is conveniently assessed and removed for use in the event of an imminent attack.

It will be appreciated that the various fasteners may be of different structures such as hook and eye, as here, adhesive, and magnets to name a few.

FIGS. 4 and 5 show various placements of the holder on the visor. It may be on the front wall 80 of the visor for immediate access or it may be on the rear wall 82 and thus hidden behind the visor and out of sight.

In either case, the invention provides a means for quickly accessing a defensive aerosol weapon for use in the event of an attack.

While the invention has been described with regard to a preferred embodiment thereof, it will be appreciated by those skilled in the art to which the invention pertains that numerous changes may be made to the invention without departing from the spirit and scope thereof.

What I claim is:

1. An article holder comprising:

an elongated member having opposed free ends;

means on each of said free ends releasably engaging one another and adapted to be releasably secured to a support;

said elongated member being a strap and said means on each of said free ends being hook and eye means;

a housing;

means on said housing releasably securing the same to said elongated member;

said housing receiving a container therein;

said housing and said container being substantially the same shape; and means on the bottom of the housing cooperating with means on the container for securing the container against rotation within the housing.

2. An article holder according to claim 1, wherein:

said housing has retention means secured thereto and adapted to engage the container to hold the same within the housing.

3. An article holder according to claim 1, wherein:

said retention means is a strap adopted to pass over the top of the container and cooperating with securing means disposed on the strap and said housing to releasably secure the container within the housing.

4. An article holder according to claim 1, and said container is an aerosol weapon canister.

5. An article holder according to claim 1, wherein said means on the bottom of the housing and said means on the container are hook and eye means.

* * * * *